US011378557B2

(12) United States Patent
Norlen

(10) Patent No.: US 11,378,557 B2
(45) Date of Patent: Jul. 5, 2022

(54) CHROMATOGRAPHY CARTRIDGE SEAL ARRANGEMENT

(71) Applicant: Biotage AB, Uppsala (SE)

(72) Inventor: Andreas Norlen, Berghamra (SE)

(73) Assignee: Biotage AB, Uppsala (SE)

( * ) Notice: Subject to any disclaimer, the term of this patent is extended or adjusted under 35 U.S.C. 154(b) by 160 days.

(21) Appl. No.: 16/757,546

(22) PCT Filed: Oct. 18, 2018

(86) PCT No.: PCT/SE2018/051063
§ 371 (c)(1),
(2) Date: Apr. 20, 2020

(87) PCT Pub. No.: WO2019/078777
PCT Pub. Date: Apr. 25, 2019

(65) Prior Publication Data
US 2021/0199629 A1 Jul. 1, 2021

(30) Foreign Application Priority Data

Oct. 19, 2017 (EP) .................................... 17197354

(51) Int. Cl.
*B01D 15/22* (2006.01)
*G01N 30/60* (2006.01)
*B01D 15/16* (2006.01)

(52) U.S. Cl.
CPC ....... *G01N 30/6026* (2013.01); *B01D 15/165* (2013.01); *B01D 15/22* (2013.01); *G01N 30/6004* (2013.01); *G01N 30/6091* (2013.01)

(58) Field of Classification Search
CPC .......... G01N 30/6026; G01N 30/6091; G01N 30/52; G01N 2030/027; G01N 2030/522;
(Continued)

(56) References Cited

U.S. PATENT DOCUMENTS

| 4,753,358 A | 6/1988 | Virca et al. |
| 5,601,708 A | 2/1997 | Leavesley |
| 7,381,327 B2 | 6/2008 | Ellis et al. |

FOREIGN PATENT DOCUMENTS

| WO | WO-2008012426 A2 | 1/2008 |
| WO | WO-2011151630 A1 | 12/2011 |
| WO | WO-2016012810 A1 | 1/2016 |

OTHER PUBLICATIONS

Machine translation of WO 2008/012426.*
International Search Report PCT/ISA/210 for International Application No. PCT/SE2018/051063 dated Dec. 27, 2018.

* cited by examiner

*Primary Examiner* — Benjamin L Lebron
(74) *Attorney, Agent, or Firm* — Harness, Dickey & Pierce, P.L.C.

(57) ABSTRACT

The present invention relates chromatography cartridge comprising a barrel to be sealed with a cap utilizing a seal member such as an O-ring. The barrel comprises barrel lip on the circular top surface of the barrel. The cap comprises a seal holder and a space to accommodate the seal member. Then the cap is mounted on the barrel an interior contact surface of the cap will contact the barrel lip and force the barrel lip to shear inwards. The barrel lip and the contact surface will form a first cartridge seal. The barrel lip will in turn contact the seal member which will contact a seal surface of the cap and the seal holder to form a second cartridge seal.

25 Claims, 5 Drawing Sheets

(58) Field of Classification Search
CPC .. G01N 30/6004; B01D 15/14; B01D 15/165; B01D 15/22; B65D 41/0442; B65D 41/0492; B65D 41/065; B65D 41/08; B65D 41/62; B65D 41/086
See application file for complete search history.

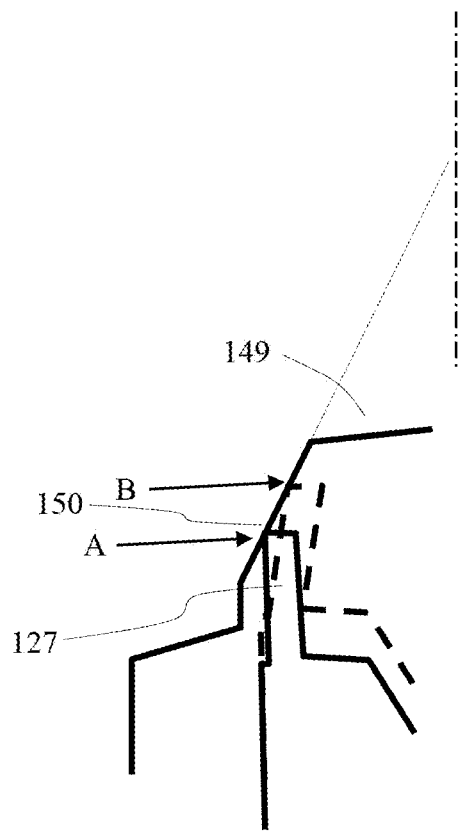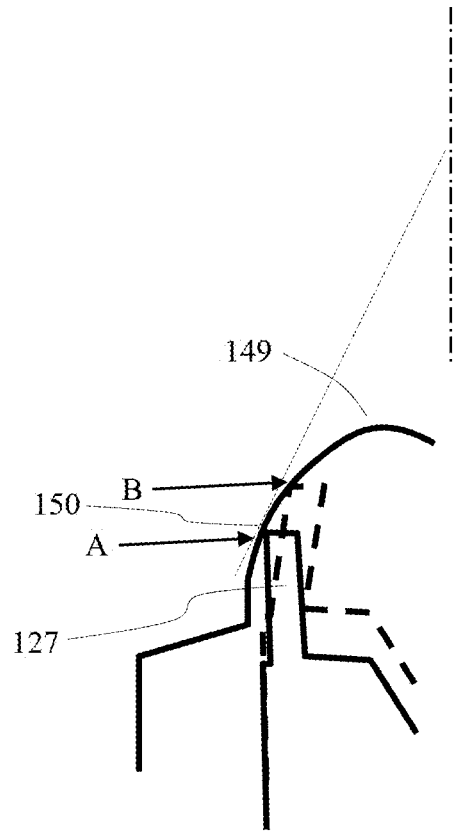
*Fig. 1e*  *Fig. 1f*
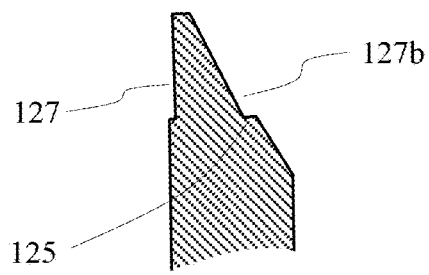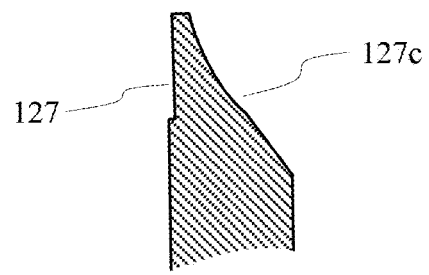
*Fig. 1g*  *Fig. 1h*

CHROMATOGRAPHY CARTRIDGE SEAL ARRANGEMENT

This application is a national phase under 35 U.S.C. § 371 of PCT International Application No. PCT/SE2018/051063, which has an International filing date of Oct. 18, 2018, which claims priority to European Patent Application No. 17197354.8 filed Oct. 19, 2017, the entire contents of each of which are hereby incorporated by reference.

FIELD OF THE INVENTION

The present invention relates to a chromatography cartridge, and more particularly to a seal arrangement in a cartridge suitable for high pressure chromatography, such as flash chromatography.

BACKGROUND OF THE INVENTION

Chromatography is a chemical separation technique utilizing the fact that substances to be separated are distributed in different ways between a stationary phase and a mobile phase. The stationary phase, or separation medium, which typically is an adsorption medium, an ion-exchanger material, a gel or a surface-modified solid material, is usually packed in a column. Different components in a sample applied to the top of the medium bed will migrate through the column at different rates depending, e.g., on their size and degree of attraction to the stationary phase when the liquid passes through the column. Liquid chromatography is extensively used for chemical analysis as well as for preparative separations in research and industry.

In traditional chromatography, the liquid or solvent passes through the column by gravity. The rate at which the liquid passes through the column is therefore relatively slow. To speed up the rate of the chromatography process, the liquid is forced through the column by the application of a positive pressure. This may be accomplished by pumping the liquid through the column, such as in HPLC (high performance liquid chromatography), or by the application of a positive air-pressure, such as in flash chromatography. Modern flash chromatography typically uses plastic pre-packed disposable columns or cartridges and in most variants the liquid is pumped through the column or cartridge.

The disposable cartridges used for flash chromatography are usually manufactured with economy in mind, which involves manufacturing the cartridges of inexpensive plastics and designing the columns to be easily assembled by filling the body of the column with the desired packing, usually with frit plugs on each end of the packing to hold the packing in place, and then closing the open end or ends of the columns by end pieces or caps, e.g. by screwing or snapping them to the column ends. The end pieces may also be glued or welded to the column, for example by spin welding or heat plate welding. The modern flash chromatography puts high demands on the cartridges being leak tight and that this property is maintained throughout the process without requiring a delicate handling. Considerable efforts have been made to provide disposable cartridges that are suited for high volume manufacturing at a reasonable cost and yet are sufficiently rigid and leak-proof.

The majority of cartridges for flash chromatography are provided to the end user as a closed pre-packed product. However for certain applications it is desirable to load the sample directly into the column or modify the column. For these purposes so called open cartridges are provided. Typically such cartridges are provided with a screw or snap cap which is mounted by the end user in the lab. Open cartridges are even more challenging with regards to ensuring that no leakage will occur during analysis, since the final mounting is entirely in the hands of the end user.

Sealing arrangements often include an O-ring or the like provided in-between in an upper surface of the column, the surface being perpendicular to the axis of the column and a corresponding surface of the cap.

Other seal arrangements do not relay on an additional sealing member as an O-ring, rather the sealing functions is provided by integral members of the cap and barrel. Such an arrangement is disclosed in U.S. Pat. No. 7,381,327 B2.

SUMMARY OF THE INVENTION

The object of the invention is to provide a cartridge for flash chromatography that overcomes the drawbacks of prior art cartridges and manufacturing techniques. This is achieved by the chromatography cartridge kit as defined in claim 1, the barrel as defined in claim 24, the cap as defined in claim 17 and the chromatography cartridge assembly as defined in claim 9.

The chromatography cartridge kit disclosed herein comprises a barrel which at least at one end is arranged to be sealed with a cap utilizing a seal member such as an O-ring. The barrel comprises a thread arranged on the outer cylindrical surface of the barrel, a barrel seal surface extending radially on the end surface of the barrel and a circumferential barrel lip provided on the barrel seal surface and extending in the longitudinal direction. The cap comprises an outer cylindrical part which on its inner surface comprises a thread mating with the thread of the barrel, a radially extending top, an intermediate part joining the outer cylindrical part with the radially extending top, and an inner cylindrical part, a seal holder provided between the outer surface of the inner cylindrical part and the inner surface of the intermediate part, a cap seal surface arranged between the seal holder and the inner surface intermediate part. The seal member is provided in the space formed by the seal holder, the inner surface of the intermediate part and the cap seal surface. The intermediate part comprises, on its inner surface, a contact surface which is arranged to be in contact with the barrel lip of the barrel then the cap is mounted on the barrel. The contact surface will exerts a force on the barrel lip which is sheared towards the centre of the cartridge. The contact surface abutting the barrel lip will form a first cartridge seal. The barrel lip in turn, exerts a force on the seal member. By this arrangement the seal member will be in contact with at least the outside of the seal holder, the cap seal surface and the inside of the barrel lip and will form a second cartridge seal. Optionally the seal member is in contact also with the barrel seal surface.

The chromatography cartridge assembly disclosed herein comprises a barrel which at least at one end is sealed with a cap utilizing a seal member such as an O-ring. The barrel comprises a thread arranged on the outer cylindrical surface of the barrel, a barrel seal surface extending radially on the end surface of the barrel and a circumferential barrel lip provided on the barrel seal surface and extending in the longitudinal direction. The cap comprises an outer cylindrical part which on its inner surface comprises a thread mating with the thread of the barrel, a radially extending top, an intermediate part joining the outer cylindrical part with the radially extending top, and an inner cylindrical part, a seal holder provided between the outer surface of the inner cylindrical part and the inner surface of the intermediate part, a cap seal surface arranged between the seal holder and the inner surface intermediate part. The seal member is provided in the space formed by the seal holder, the inner surface of the intermediate part and the cap seal surface. The intermediate part comprises, on its inner surface, a contact surface which is in contact with, and exerts a force on, the barrel lip which is sheared towards the centre of the cartridge. The contact surface abutting the barrel lip will form a first cartridge seal. The barrel lip in turn, exerts a force on the seal member. By this arrangement the seal member will be in contact with at least the outside of the seal holder, the cap seal surface and the inside of the barrel lip and will form a second cartridge seal. Optionally the seal member is in contact also with the barrel seal surface.

According to one embodiment of the invention the seal holder is a flange extending in the longitudinal direction from the radially extending top towards the open end of the cap. Alternatively the seal holder is a thickening of the inner cylindrical part. Yet in another embodiment the outer surface of the inner cylindrical part forms the seal holder.

According to one embodiment of the invention the contact surface has a cone shape, which, in a longitudinal cross-section, means that the contact surface is a straight line with an angle of 45°+/=20° with the mid axis of the cartridge.

According to another embodiment of the invention the contact surface has an inwardly concave shape, wherein in a longitudinal cross-section, the contact surface is an inwardly concave and continuous curve, wherein all tangents of the curve forms an angle of 45°+/−20° with the mid axis of the cartridge.

According to one embodiment of the invention, in a longitudinal cross-section, the cap seal surface is a concave curve open in the direction towards the open end of the cap and the contact surface and the cap seal surface is a continues curve.

According to one embodiment of the invention at least one of the outer or inner cylindrical surfaces of the barrel lip is slanted and the base of the barrel lip is broader than the top of barrel lip. Alternatively the least one of the outer or inner cylindrical surfaces of the barrel lip is curved.

Thanks to the seal arrangement disclosed herein a sealing function that provides a first and a second cartridge seal, the latter involving at least three surfaces. This gives a high security in the sealing of cartridge.

Prior art cartridges typically comes to a dead stop in the screwing action and it is not until at the stop, or just before, that the cartridge is sealed. In comparison the cartridge according to the invention has a rather smooth stop and secure sealing is achieved for a prolonged turning of the cap relative the barrel. Preferably, the cap can be turned 90° or more from a first position that is sealed to a second position that represents a stop with regards to a torque which a user typically would apply. To provide secure sealing for a prolonged turning distance represents a major advantage for the so called open cartridges since it makes the closing action less sensitive to for example the strength and care of the user. Further, it also facilitates the production of pre-packed cartridges in that the cap can be positioned with high accuracy relative the barrel 120 in the final mounting.

A further advantage is that the prolonged turning represents a corresponding distance in the longitudinal direction and flexibility is introduced in that direction. This means that slight variations in the thickness of frits, filters and other parts provided in the barrel can be absorbed and tighter fit and/or less dead volume between the different parts is achieved.

In the following, the invention will be described in more detail, by way of example only, with regard to non-limiting embodiments thereof, reference being made to the accompanying drawings.

DETAILED DESCRIPTION

Figure 1:
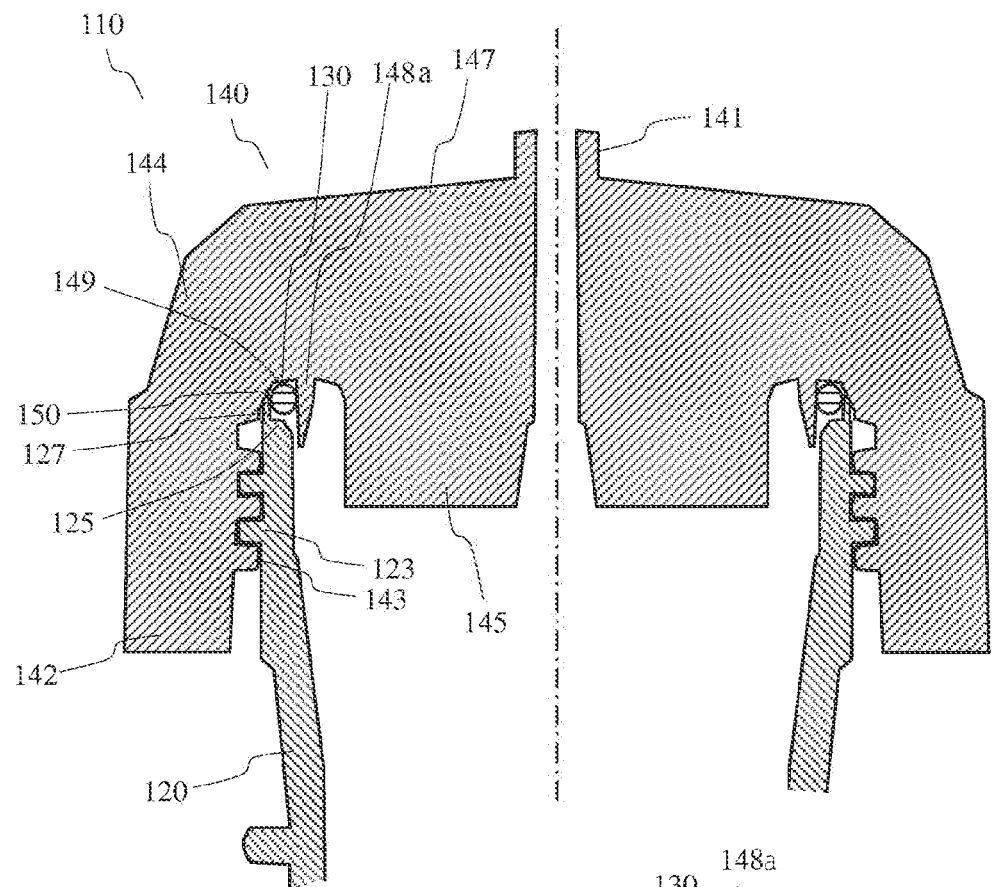
FIG. 1 (*a*) is a schematic cross-sectional view of the a part of the barrel and cap, (*b-e*) are an enlarged schematic cross-sectional views of the barrel and cap according to one embodiment of the invention, and, and (*f-h*) is an enlarged cross-sectional view of the barrel and the cap according to another embodiment of the present invention.
Figure 1:
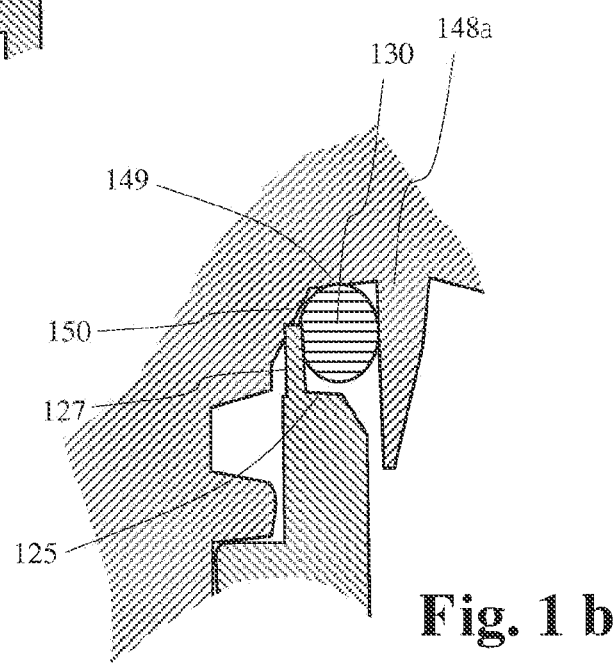

As described in the background section flash chromatography cartridges are distributed in a closed pre-packed configuration or as open cartridges. Open typically meaning that the end user can open a top enclosure of the cartridge and after preparation close the cartridge again. A pre-packed cartridge is typically produced by closing the bottom of the barrel with a bottom cap, mount the interior parts and close with a top cap. Most parts are typically pre-fabricated in automated moulding processes. The production can very simplified be described as a two stage process, wherein in the first stage the plastic parts are fabricated and in the second stage the cartridge is packed and sealed. The second stage is typically more adaptable to various end applications, customer demands etc.

The cartridge 110 according to the present invention is schematically depicted in FIGS. 1*a-f* in cross-sectional views, wherein 1*a*) is the inlet end of cartridge with the cap mounted on the barrel, *b-f*) are a close-ups of the sealing portion of the cartridge. The cartridge 110 will be described as comprising a barrel 120 with a cap 140 mounted in one end. This is to give a comprehensive description only. Also the barrel 120 and the cap 140 as separate units are inventive as such. It is further recognized that the cartridge 110 may be provided to users as a kit, wherein the cap 140 is not mounted on the barrel 120, the final assembling to be performed by the end user. FIG. 1*a* shows the parts close to the inlet of the barrel 120 and the cap 140, symmetrical around the indicated thought cartridge mid axis. The barrel 120, typically a cylindrical plastic tube, at one end provided with an outlet end piece (not shown) comprising an outlet. On the other end, the inlet end, the barrel 120 is provided with a cap 140 comprising an inlet 141. Also the cap 140 and end piece are typically of a plastic material, commonly the same plastic material as the barrel 120. Suitable materials are thermoplastic polymers, such as polypropylene. The outlet end piece may be fully integrated in the barrel 120. As appreciated by the skilled person a cartridge for flash chromatography comprises a number of other functional parts comprised within the cartridge, such as inlet and outlet frits, chromatography medium e.g. silica as well as various support structures. For clarity, these features are not shown. Similarly the cartridge may be provided with support or mounting structures for mounting the cartridge onto or into the chromatography apparatus. Also for clarity, such external structures are not shown or discussed.

As illustrated in FIG. 1a-f the inlet end of the barrel 120 that will engage with the cap 140, is provided with a thread 123 on its outer cylindrical surface and adjacent to the inlet end of the barrel 120. The barrel 120 ends with a barrel sealing surface 125, which typically and preferably is in a plane perpendicular to the cartridge mid axis. Alternatively the barrel sealing surface 125 may have an inclination to the cartridge mid axis in the range +/−45°. The barrel sealing surface 125 may, as depicted be essentially flat, but may alternatively have a curvature, for example an concave curvature to accommodate a sealing member. The barrel sealing surface 125 is provided with a circumferential lip 127 extending essentially in the longitudinal direction of the barrel. The length of the lip 127, its position on the barrel sealing surface 125, and the width of the barrel sealing surface 125 should be dimensioned so that a seal member 130, for example an O-ring, can be accommodated on the inside of the lip 127 and resting, at least in part, on the barrel sealing surface 125. The lip 127 is preferably positioned closer to the outer surface than the inner surface of the barrel 120. The outer surface of the lip 127 may be flushed with the outer surface of the barrel 120, but may alternatively be retracted a distance. The barrel lip 127 should be dimensioned to function with the sealing member 130 of choice as well as the size of the cartridge. For common sizes of cartridges, i.e. from 5-400 gram (media weight), a height of the barrel lip 127 in the order of 2-15 mm and a width of 0.5-1.5 mm is suitable.

The cap 140, schematically illustrated in FIG. 1b, has an open end for receiving a barrel and an opposite end, which is closed apart from the inlet 141 for connecting the cartridge to the chromatography apparatus, typically with a hose. The cap 140 comprises an outer cylindrical part 142, a radially extending top 147 provided with the inlet 141, an intermediate part 144 joining the outer cylindrical part 142 and the radially extending top 147, and an inner cylindrical part 145. The inner cylindrical part 142 extends a distance from the radially extending top 147 in the direction towards the open end of the cap 140. A thread 143 is provided on the inner surface of the outer cylindrical part 142 and designed to engage with the thread 123 of the barrel. An inner space of the cap 140 for receiving a portion of the barrel 120 is formed by the cylindrical part 142, the radially extending top 147, the intermediate part 144 and the inner cylindrical part 145. A seal holder 148 is provided between the outer surface of the inner cylindrical part 145 and the inner surface of the intermediate part 144. Arranged between the seal holder 148 and the intermediate part 144 and extending in a general radial direction is a cap seal surface 149. The inner surface of the intermediate part 144 comprises a contact surface 150 at least partly facing the seal holder 148 and/or the inner cylindrical part 145. The contact surface 150 is designed to engage with the barrel lip 127 and exert a force to the barrel lip 127 with a component in the inwards radial direction so that, with the cap 140 fully mounted on the barrel 127, the barrel lip 127 is sheared inwards. During mounting the barrel lip 127 makes first contact with the contact surface 150 at a first position, indicated with A in FIG. 1c-f. With the cap 140 moving closer to the end of the barrel 120 during the screwing action the contact surface 150 forces the barrel lip in the inwards direction until a final position B is reached. The exact position of B will be dependent on how far the cap 140 is screwed onto the barrel 120, which in turn typically will depend on the torque applied to the cap 140. Appropriate position and/or torque are typically established for a particular cartridge size and that information is transferred to an end user. The contact surface 150 should at least within the region between A and B, have a conical shape or have a inwardly concave shape. This corresponds to that the contact surface 150 in a longitudinal cross-section of the cartridge 110, should be a straight line or form an inwardly concave and continuous curve. According to one embodiment, schematically illustrated in FIG. 1e, the cross-section of the contact surface 150 is a straight line with an angle of 45°+/−30° with the mid axis. According to an alternative embodiment, schematically illustrated in FIG. 1f, the cross-section of the contact surface 150 is an inwardly concave and continuous curve, wherein all tangents of the curve form an angle of 45°+/−30° with the mid axis. FIG. 1f also illustrates that the cap seal surface 149 may have a curvature, for example a concave curve open in the direction towards the open end of the cap 140. The transitions between the contact surface 150 and the cap seal surface 149 are preferably rounded, i.e. in the cross sectional view forms a continuous curve.

The cap seal surface 149 and the seal holder 148 are arranged to accommodate a seal member 130. Preferably the seal member 130 is provided with the cap 140, for example by letting the seal member 130 in its relaxed state having a diameter that is slightly smaller than the diameter of the seal holder 148, so that the seal member is kept around the seal holder 148. Alternatively the seal member 130 may be glued to the cap 140, or so dimensioned so that it presses against the inner surface of the intermediate part 144. Alternatively, or to further secure fixation of the seal member 130, the seal holder may be provided with circumferential protrusion or a number of localized protrusions below the seal member 130. Another alternative is to provide the seal member 130 with the barrel 120, for example so dimensioned that it presses slightly against the inner surface of the lip 127, and thereby is held in place.

Figure 1C:
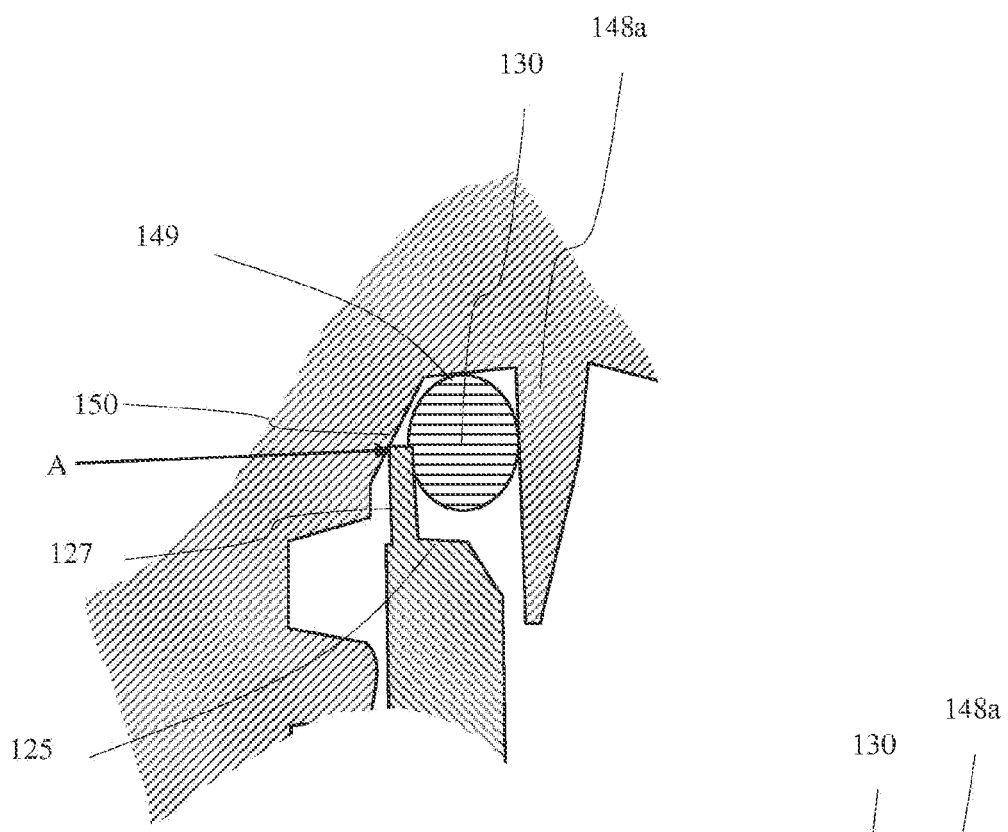
Figure 1D:
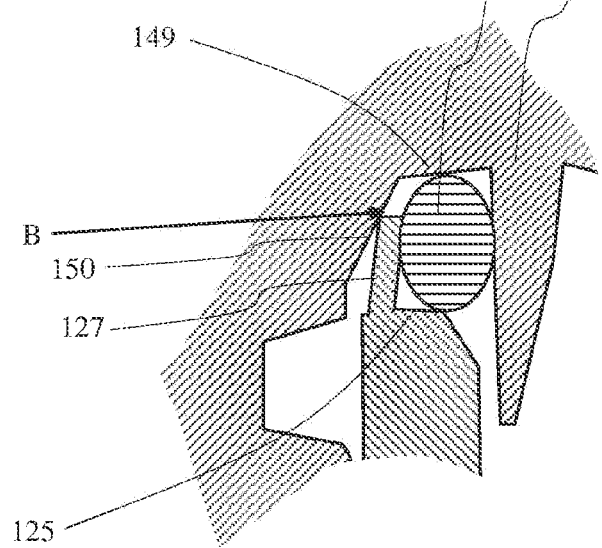
Figure 2A:
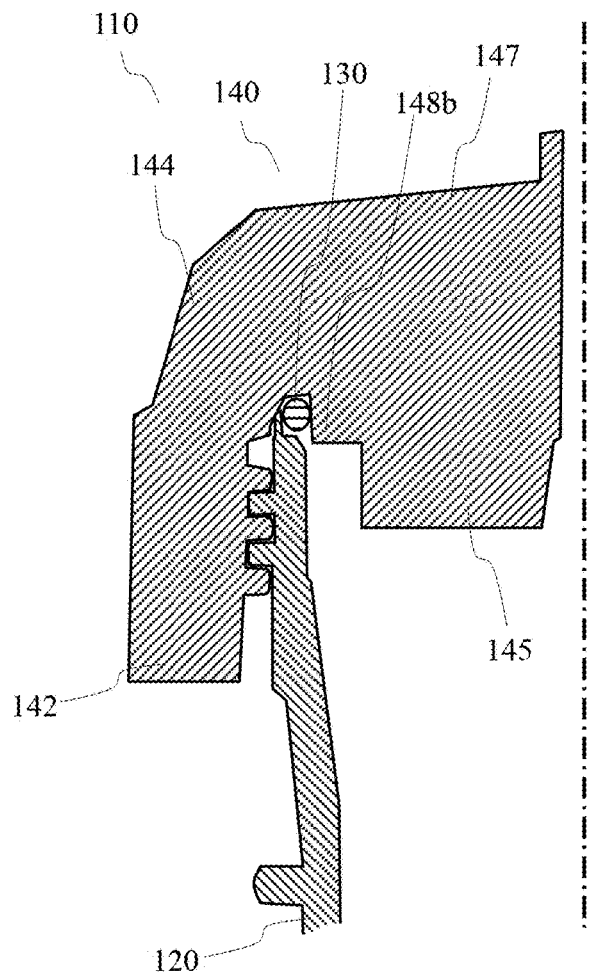
FIG. 2*a-b* are schematic cross-sectional views of embodiments of the barrel and cap according to the present invention.
Figure 2B:
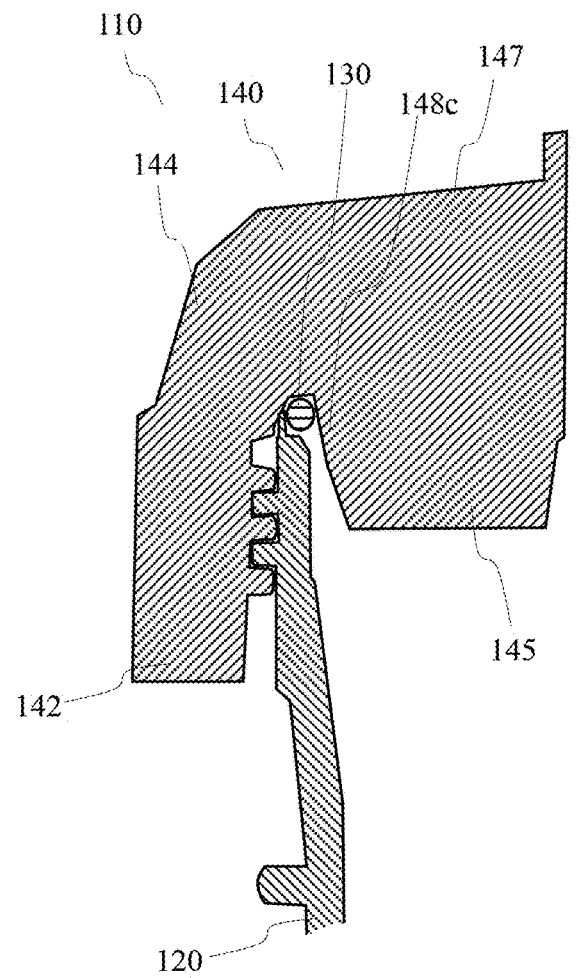

According to one embodiment the seal holder is a flange 148a extending in the longitudinal direction from the radially extending top 147 towards the open end of the cap 140, as illustrated in FIG. 1a-c. According to another embodiment the seal holder 148 is a thickening 148b of the inner cylindrical part 145 as illustrated in FIG. 2a. According to a further embodiment, schematically illustrated in FIG. 2b, which typically may be utilized for small size cartridges, the outer surface of the inner cylindrical part 145 acts as the seal holder 148c, which hence can be seen as integrated in the inner cylindrical part 145.

With the cap 140 fully screwed unto the barrel 120, as illustrated in FIG. 1c, the contact surface 150 of the cap 140 is in contacted with the lip 127 of the barrel 120 and part of the lip 127 is displaced towards the centre of the cartridge 110. The displaced position of the lip 127 is indicated with dashed lines in FIGS. 1e-f. The contact surface 150 abuts the outer surface of the barrel lip 127 which will be sheared as it is fixed to the barrel seal surface 125 on its opposite end. The contact surface 150 abutting the barrel lip 127 will form a first cartridge seal. The lip 127 will act on the seal member 130 and contribute in the slight deforming of the seal member 130 that is a part of the sealing function. The seal member 130 will contact and seal against at least three surfaces, the lip 127, the cap seal surface 149, the outer surface of the seal holder 148 and optionally also against the barrel seal surface 125. The seal member 130, interacting with the cap seal surfaces 149, outer surface of the seal holder 148 and optionally with 125 will form a second cartridge seal. The seal holder 148 should not be in contact with the barrel 120 as that could jeopardize the sealing function provided by the seal member 130.

The seal member 130 may be an O-ring, but also other geometries will function with minor modifications of the other involved parts, for example a sealing member with an oval or rectangular cross-section. Suitable materials for the seal member 130 is materials commonly used for sealing applications such as rubber, silicone, nitrile or EPDM.

The barrel lip 127 has for illustrative purposes been depicted as having a rectangular cross section. In order to give a suitable combination of for example rigidness in the axial direction and inwards flexibility, the lip 127 may have a cross section that is non-rectangular. According to one embodiment, schematically illustrated in FIG. 1g, the barrel lip 127 has at least one surface 127b that is slanted so that the barrel lip (127) is broader at its base than at its top. The slanted surface 127b may be flushed with the inner surface of the barrel 120. In that case the slanted surface 127b also forms the barrel seal surface 125. Alternatively the slanted surface 127b is retracted a distance from the inner surface of the barrel 120 so that the barrel seal surface 125 is formed between the slanted surface 127b and the inner surface of the barrel 120. According to another embodiment, schematically illustrated in FIG. 1h, the barrel lip 127 has at least one surface 127c that is curved so that the barrel lip (127) is broader at its base than at its top. The curved surface 127c may meet the inner surface of the barrel, which for example may be bevelled so that the meeting point of the surface can been seen as an inflexion point. In this case the curved surface 127c also forms the barrel seal surface 125. Alternatively the curved surface 127c is retracted a distance from the inner surface of the barrel 120, so that the barrel seal surface 125 is exposed. Also the outer surface of the lip 127 may be slanted or curved (not shown).

The sealing function involving the first and second cartridge seal, the latter providing contact with at least three surfaces, provides high security in the sealing of the cartridge. Prior art cartridges typically comes to a dead stop in the screwing action and it is not until at the stop, or just before, that the cartridge is sealed. In comparison the cartridge according to the invention has a rather smooth stop and secure sealing is achieved for a prolonged turning. Preferably, the cap 140 can be turned 90° or more from a first position that is sealed to a second position that represents a stop with regards to a torque which a user typically would apply to the cap 140. To provide secure sealing for a prolonged turning is important for the so called open cartridges since it makes the closing action less sensitive to for example the strength and care of the user. Further, the prolonged turning represents a corresponding distance in the longitudinal direction and flexibility is introduced in that direction. This means that slight variations in the thickness of frits, filters and other parts provided in the barrel can be absorbed and tighter fit and/or less dead volume between the different parts is achieved. Further, it also facilitates the production of pre-packed cartridges in that the caps 140 position relative the barrel 120 can be made more accurate in the final sealing of the cartridge 110.

According to one embodiment of the invention the cartridge 310 is a closed pre-packed cartridge.

Figure 3:
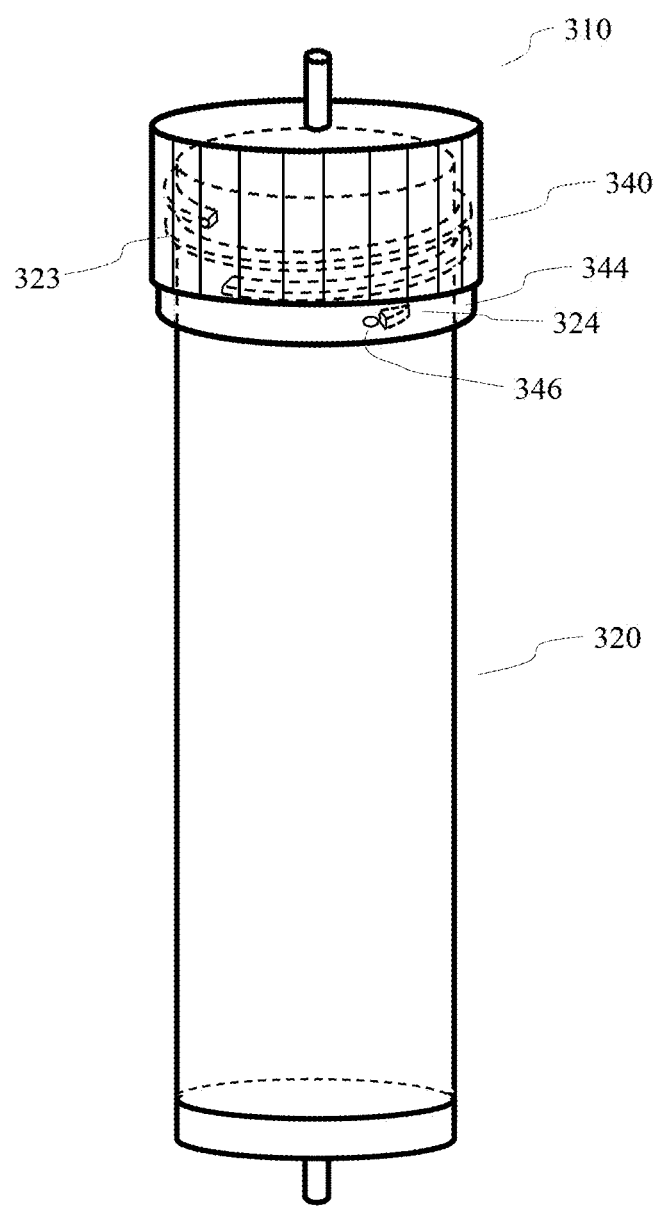
FIG. 3 is a semi-transparent perspective view of a closed cartridge according to one embodiment of the invention.

According to a further embodiment, schematically illustrated in FIG. 3, the barrel 320 and the cap 340 are provided with matching the sealing means described with reference to FIGS. 1-3. The thread 323 is preferably a normal right-hand thread giving a clockwise screw direction. Below the thread 323 in the direction from the inlet end of the barrel 320, is at least one protrusion 324 provided. The protrusion 324 extents from the outer surface of the barrel 320 in an essentially outwards radial direction, preferably with a height of 0.5-5 mm from the surface of the barrel 320. The protrusion 324 of the barrel 320 is adapted to interact with a post-fabricated locking member 346, provided on a flange 344 of the cap 340 to form a mechanical connection. The mechanical connection will after the final assembly of the cartridge, then the locking member 346 of the cap 340 has been provided, prevent the cap 340 from being unscrewed. The locking member 346 may for example be an indent, a melted structure in the flange 344 or added material to the flange 344, which represent different embodiments of the invention. In the following an indent is used as an illustrative example.

As will be further described below, the protrusion 324 should interact with a locking member in the cap 340 to provide a locking function of the cap 340 to the barrel 320. The design of the protrusion 324 can be varied relatively freely as long as the interaction with the locking member of the cap 340 is such that a secure locking is ensured. According to one embodiment the side of the protrusion that faces a direction that is opposite the screw direction is essentially perpendicular to the outer surface of the barrel 320. According to one embodiment the protrusion comprises a flat surface facing a direction that is opposite the screw direction, and forms an angle to the outer surface of the barrel 320 that is less than 90 degrees, so as to form a hooked shaped design.

The cap 340 has a closed end provided with the inlet 341 forming the inlet part of the cartridge 310 and an open end for receiving the barrel 320. The cap 340 is provided with an internal thread matching the thread 323 of the barrel 320. Below the thread 343 of the cap 340, as seen from the inlet end of the cap 140, and adjacent to the open end of the cap 340 is a cylindrical flange 344 arranged, which ends the cap 340 in the open end of the cap 340. The inner diameter of the flange 344 is such that it can accommodate the protrusion or protrusions 324 of the barrel 320 without contacting, or just contacting, the protrusions 324. A play between the protrusion 324 and the inner surface 345 of the flange 344 up to the order of a few millimetres may be acceptable. The flange 344 has preferably a continuous surface, but may have cut outs. Accommodated should be understood that each protrusion 324 is covered by a flange portion.

The flange 344 of the cap 340 is provided with at least one post-fabricated locking member 346 extending essentially radially inwards from the inner cylindrical surface of the flange 344 of the cap 340. According to one embodiment of the invention the locking member 346 is an indent. The indent 346 extents a distance from the inner surface 346 that substantially exceeds the play, if a play is present. The overlap in the radial direction between the protrusion 324 and the indent 346 may preferably exceed at least a third of the length that the protrusion 324 extends from the outer surface of the barrel 320.

The indent 346 should be positioned in relation to the protrusion 324 so that the indent 346 is after, and adjacent the protrusion 324 in the screw direction. Preferably the indent 346 abuts the protrusion 324. This gives a secure locking of the cap 340, so it can not be unscrewed from the barrel 320 and no play is present if a user is trying to unscrew the cap 140 from the barrel 320.

The term "post-fabricated indent" is used to illustrate that the locking member, for example the indent 346 has been provided in connection with the final assembly of the pre-packed cartridge 310 and after the cap 340 has been screwed onto the barrel 320, it is not a structure given by the moulding process, for example. The indent 324 have typically and preferably been provided to the flange by punching the outer surface of the flange 344 with a punch with a predetermined impact and punching depth in a last, or one of the last steps in finalising the pre-packed cartridge 310. The punching typically results in a local plastic deformation, i.e. non-reversible deformation, of the flange 344. According to one embodiment of invention the indent 346 comprises at least a portion that is plastically deformed.

The position of the indent 346 relative the protrusion 324 should further relate in such a manner that it is secured that the sealing means are engaged so that cartridge is leak-proof. The seal arrangement according to the invention gives in the order of 90° flexibility in the relative position between the cap 140 and the barrel 120. This simplifies the punching operation.

The cartridge 110/310; has above been described with the cap 140/340 and barrel 120/320 being joined with a thread. "Thread" should here be interpret to include all types of joining mechanisms that utilizes a twisting or screwing motion, for example bayonet couplings.

Having a cap on the inlet end and an integral end-piece on the outlet end of the chromatography cartridge represents a common version in flash chromatography. Other alternatives could be envisaged, for example having caps in both ends of the barrel which both utilizes the above described locking mechanism. Alternatively a cap is provided only at the outlet end of the cartridge and provided with the locking mechanism. The skilled person would, given the teachings herein, know how to adapt the different parts to function according to the present invention.

The present invention is not limited to the above-described embodiments. Various alternatives, modifications and equivalents may be used. Therefore, the above embodiments should not be taken as limiting the scope of the invention, which is defined by the appending claims.

The invention claimed is:

1. A chromatography cartridge kit comprising:
a barrel arranged to be, at least at one end, sealed with a cap and a seal member, wherein:
the barrel comprises a thread arranged on the outer cylindrical surface of the barrel, a barrel seal surface extending radially on the end surface of the barrel and a circumferential barrel lip provided on the barrel seal surface and extending in the longitudinal direction;
the cap comprises an outer cylindrical part on its inner surface comprising a thread arranged to mate with the thread of the barrel, a radially extending top, an intermediate part joining the outer cylindrical part with the radially extending top, and an inner cylindrical part, a seal holder provided between the outer surface of the inner cylindrical part and the inner surface of the intermediate part, a cap seal surface arranged between the seal holder and the inner surface of the intermediate part; and
the seal member is to be provided in a space formed by the seal holder, the inner surface of the intermediate part and the cap seal surface; and
wherein:
the intermediate part of the cap on its inner surface comprises a contact surface, and when the cap is mounted on the barrel, the contact surface is arranged to be in contact with, and exerts a force on, the outer surface of the barrel lip which is sheared towards the centre of the chromatography cartridge kit and which barrel lip in turn exerts a force on the seal member, the contact surface and the barrel lip forming a first cartridge seal; and
the seal member is arranged to be in contact with at least the outside of the seal holder, the cap seal surface and the inside of the barrel lip, forming a second cartridge seal.

2. The chromatography cartridge kit according to claim 1, wherein the seal holder is a flange extending in the longitudinal direction from the radially extending top towards an open end of the cap.

3. The chromatography cartridge kit according to claim 1, wherein the seal holder is a thickening of the inner cylindrical part.

4. The chromatography cartridge kit according to claim 1, wherein in a longitudinal cross-section, the contact surface is a straight line with an angle of 45°+/−30° with the mid axis of the chromatography cartridge kit.

5. The chromatography cartridge kit according to claim 1, wherein in a longitudinal cross-section, the contact surface is an inwardly concave and continuous curve, wherein all tangents of the curve form an angle of 45°+/−30° with the mid axis of the chromatography cartridge kit.

6. The chromatography cartridge kit according to claim 5, wherein in a longitudinal cross-section, the cap seal surface is a concave curve open in the direction towards an open end of the cap and the contact surface and the cap seal surface is a continuous curve.

7. The chromatography cartridge kit according to claim 1, wherein the seal member is in contact with the barrel seal surface.

8. The chromatography cartridge kit according to claim 1, wherein at least one of the outer or inner cylindrical surfaces of the barrel lip is slanted and the base of the barrel lip is broader than the top of barrel lip.

9. The chromatography cartridge kit according to claim 1, wherein at least one of the outer or inner cylindrical surfaces of the barrel lip is curved and the base of the barrel lip is broader than the top of barrel lip.

10. A chromatography cartridge assembly comprising:
a barrel at least at one end sealed with a cap and a seal member, wherein:
the barrel comprises a thread arranged on the outer cylindrical surface of the barrel, a barrel seal surface extending radially on the end surface of the barrel and a circumferential barrel lip provided on the barrel seal surface and extending in the longitudinal direction;
the cap comprises an outer cylindrical part on its inner surface comprising a thread mating with the thread of the barrel, a radially extending top, an intermediate part joining the outer cylindrical part with the radially extending top, and an inner cylindrical part, a seal holder provided between the outer surface of the inner cylindrical part and the inner surface of the intermediate part, a cap seal surface arranged between the seal holder and the inner surface of the intermediate part; and
the seal member is provided in a space formed by the seal holder, the inner surface of the intermediate part and the cap seal surface; and wherein:
the intermediate part on its inner surface comprises a contact surface, the contact surface being in contact with, and exerts a force on, the outer surface of the barrel lip which is sheared towards the centre of the chromatography cartridge assembly and which barrel lip in turn exerts a force on the seal member, the contact surface and the barrel lip forming a first cartridge seal; and the seal member is in contact with at least the outside of the seal holder, the cap seal surface and the inside of the barrel lip, forming a second cartridge seal.

11. The chromatography cartridge assembly according to claim 10, wherein the seal holder is a flange extending in the longitudinal direction from the radially extending top towards an open end of the cap.

12. The chromatography cartridge assembly according to claim 10, wherein the seal holder is a thickening of the inner cylindrical part.

13. The chromatography cartridge assembly according to claim 10, wherein in a longitudinal cross-section, the contact surface is a straight line with an angle of 45°+/−30° with the mid axis of the chromatography cartridge assembly.

14. The chromatography cartridge assembly according to claim 10, wherein in a longitudinal cross-section, the contact surface is an inwardly concave and continuous curve, wherein all tangents of the curve form an angle of 45°+/−30° with the mid axis of the chromatography cartridge assembly.

15. The chromatography cartridge assembly according to claim 14, wherein in a longitudinal cross-section, the cap seal surface is a concave curve open in the direction towards an open end of the cap and the contact surface and the cap seal surface is a continuous curve.

16. The chromatography cartridge assembly according claim 10, wherein the seal member is in contact with the barrel seal surface.

17. The chromatography cartridge assembly according claim 10, wherein at least one of the outer or inner cylindrical surfaces of the barrel lip is slanted and the base of the barrel lip is broader than the top of barrel lip.

18. The chromatography cartridge assembly according to claim 10, wherein at least one of the outer or inner cylindrical surfaces of the barrel lip is curved and the base of the barrel lip is broader than the top of barrel lip.

19. A cap for being mounted on a barrel to seal a chromatography cartridge utilizing a seal member, wherein the cap comprises:
    an outer cylindrical part that on its inner surface comprises a thread arranged to mate with a thread arranged on the outer cylindrical surface of a barrel on which the cap is to be mounted,
    a radially extending top,
    an intermediate part joining the outer cylindrical part with the radially extending top and an inner cylindrical part,
    a seal holder provided between the outer surface of the inner cylindrical part and the inner surface of the intermediate part, and
    a cap seal surface arranged between the seal holder and the inner surface of the intermediate part,
    wherein a space formed by the seal holder, the inner surface of the intermediate part and the cap seal surface is arranged to accommodate the seal member,
    wherein the intermediate part of the cap on its inner surface comprises a contact surface, and when the cap is mounted on the barrel, the contact surface is arranged to be in contact with, and exerts a force on, an outer surface of a circumferential barrel lip being provided on a barrel seal surface extending radially on the end surface of the barrel, the circumferential barrel lip extending in the longitudinal direction, wherein the circumferential barrel lip is sheared towards the centre of the chromatography cartridge and which barrel lip in turn exerts a force on the seal member, the contact surface and the barrel lip thereby forming a first cartridge seal;
    wherein, when the cap is mounted on the barrel, the seal member is arranged to be in contact with at least the outside of the seal holder, the cap seal surface, and the inside of the barrel lip, forming a second cartridge seal,
    wherein in a longitudinal cross-section, the contact surface is a straight line with an angle of 45°+/−30° with the mid axis of the chromatography cartridge.

20. The cap according to claim 19, wherein the seal holder is a flange extending in the longitudinal direction from the radially extending top towards the open end of the cap.

21. The cap according to claim 19, wherein the seal holder is a thickening of the inner cylindrical part.

22. A cap for being mounted on a barrel to seal a chromatography cartridge utilizing a seal member, wherein the cap comprises:
    an outer cylindrical part that on its inner surface comprises a thread arranged to mate with a thread arranged on the outer cylindrical surface of a barrel on which the cap is to be mounted,
    a radially extending top,
    an intermediate part joining the outer cylindrical part with the radially extending top and an inner cylindrical part,
    a seal holder provided between the outer surface of the inner cylindrical part and the inner surface of the intermediate part, and
    a cap seal surface arranged between the seal holder and the inner surface of the intermediate part,
    wherein a space formed by the seal holder, the inner surface of the intermediate part and the cap seal surface is arranged to accommodate the seal member,
    wherein the intermediate part of the cap on its inner surface comprises a contact surface, and when the cap is mounted on the barrel, the contact surface is arranged to be in contact with, and exerts a force on, an outer surface of a circumferential barrel lip being provided on a barrel seal surface extending radially on the end surface of the barrel, the circumferential barrel lip extending in the longitudinal direction, wherein the circumferential barrel lip is sheared towards the centre of the chromatography cartridge and which barrel lip in turn exerts a force on the seal member, the contact surface and the barrel lip thereby forming a first cartridge seal;
    wherein, when the cap is mounted on the barrel, the seal member is arranged to be in contact with at least the outside of the seal holder, the cap seal surface and the inside of the barrel lip, forming a second cartridge seal, wherein in a longitudinal cross-section, the contact surface is an inwardly concave and continuous curve, wherein all tangents of the curve form an angle of 45°+/−30° with the mid axis of the chromatography cartridge.

23. The cap according to claim 22, wherein in a longitudinal cross-section, the cap seal surface is a concave curve open in the direction towards an open end of the cap and the contact surface and the cap seal surface is a continuous curve.

24. The cap according to claim 22, wherein the seal holder is a flange extending in the longitudinal direction from the radially extending top towards an open end of the cap.

25. The cap according to claim 22, wherein the seal holder is a thickening of the inner cylindrical part.

* * * * *